US012803929B2

(12) United States Patent
Oe et al.

(10) Patent No.: US 12,803,929 B2
(45) Date of Patent: Nov. 17, 2026

(54) INFORMATION PROCESSING METHOD AND STORAGE MEDIUM

(71) Applicant: Humming Heads, Inc., Tokyo (JP)

(72) Inventors: Naoyuki Oe, Tokyo (JP); Takahiro Shima, Tokyo (JP)

(73) Assignee: Humming Heads, Inc., Tokyo (JP)

( * ) Notice: Subject to any disclaimer, the term of this patent is extended or adjusted under 35 U.S.C. 154(b) by 0 days.

(21) Appl. No.: 18/422,067

(22) Filed: Jan. 25, 2024

(65) Prior Publication Data

US 2024/0171528 A1 May 23, 2024

Related U.S. Application Data

(63) Continuation of application No. PCT/JP2021/027650, filed on Jul. 27, 2021.

(51) Int. Cl.
*G06F 15/173* (2006.01)
*H04L 47/70* (2022.01)
*H04L 47/80* (2022.01)

(52) U.S. Cl.
CPC .......... *H04L 47/828* (2013.01); *H04L 47/808* (2013.01)

(58) Field of Classification Search
CPC ............................ H04L 47/828; H04L 47/808
USPC ........................................................ 709/226
See application file for complete search history.

(56) References Cited

U.S. PATENT DOCUMENTS 8,239,923 B2 * 8/2012 Kirshnan ................ H04L 45/56 709/224
8,495,181 B2 * 7/2013 Venkatraman ........ H04L 63/102 726/13
8,706,877 B2 * 4/2014 Sundarrajan ............ H04L 67/34 709/227
8,869,262 B2 * 10/2014 Mullick .............. H04L 63/0876 709/227

(Continued)

FOREIGN PATENT DOCUMENTS

JP H07-084852 A 3/1995
JP 2007-140798 A 6/2007

(Continued)

OTHER PUBLICATIONS

International Search Report and Written Opinion issued on Oct. 12, 2021 in parent application PCT/JP2021/027650.

(Continued)

*Primary Examiner* — Alan S Chou
(74) *Attorney, Agent, or Firm* — Venable LLP

(57) ABSTRACT

An information processing method for controlling access to a computer resource includes capturing an operation request for the computer resource from a process or the operating system before a computer resource is accessed, and selecting a policy suitable for a state of a computer from a plurality of policies with access privilege allowed for each one of a plurality of types of work defined as a policy for each work. The method also includes determining whether or not there is access privilege for a computer resource specified by the operation request captured in the capturing on a basis of the policy selected in the selecting, and executing processing to send the operation request as is to the operating system if a result of the determining is that there is an access privilege and send the result back to a request source process.

18 Claims, 9 Drawing Sheets

(56) References Cited

U.S. PATENT DOCUMENTS

| | | | | |
|---|---|---|---|---|
| 2007/0156694 | A1 | 7/2007 | Lim | |
| 2009/0037585 | A1* | 2/2009 | Miloushev | G06F 9/5027 709/226 |
| 2009/0240907 | A1* | 9/2009 | Crandell | G06F 21/31 711/E12.001 |
| 2010/0037236 | A1 | 2/2010 | Oe et al. | |
| 2012/0131199 | A1* | 5/2012 | Larkin | G06F 9/5016 709/226 |
| 2014/0007184 | A1* | 1/2014 | Porras | G06F 21/6218 726/1 |
| 2015/0046706 | A1* | 2/2015 | Makarov | G06F 21/6218 713/165 |
| 2017/0063927 | A1 | 3/2017 | Schultz et al. | |
| 2024/0386126 | A1* | 11/2024 | Oe | G06F 21/6218 |

FOREIGN PATENT DOCUMENTS

| | | | |
|---|---|---|---|
| JP | 2010-176431 | A | 8/2010 |
| JP | 2015-166952 | A | 9/2015 |

OTHER PUBLICATIONS

Extended European Search Report issued Mar. 21, 2025 in counterpart European Patent Appln. No. 21951781.0.

* cited by examiner

FIG. 3

2035

ACCESS RIGHT MANAGEMENT TABLE

| 20351 | 20352 | 20353 | | 2035n |
|---|---|---|---|---|
| RESOURCE DESIGNATION INFORMATION A | CONDITION A | ACCESS RIGHT INFORMATION A1 | ... | ACCESS RIGHT INFORMATION An |
| RESOURCE DESIGNATION INFORMATION B | CONDITION B | ACCESS RIGHT INFORMATION B1 | ... | ACCESS RIGHT INFORMATION Bn |
| RESOURCE DESIGNATION INFORMATION C | CONDITION C | ACCESS RIGHT INFORMATION C1 | ... | ACCESS RIGHT INFORMATION Cn |
| .... | ....... | ...... | ..... | ...... |

SEPARATION POLICY EXAMPLE

| SEPARATION POLICY | CONTROL INFORMATION | | | |
|---|---|---|---|---|
| | USABLE PROGRAMS | READABLE AREAS | WRITABLE AREAS | TEMPORARY ACCESS |
| FOR CONFIDENTIAL IN-COMPANY WORK | SCHEDULE MANAGEMENT APPLICATIONS;<br>DEVELOPMENT APPLICATIONS;<br>DOCUMENT CREATION APPLICATIONS;<br>BASICALLY ALL CAN BE USED | EXTERNAL HDD;<br>INTERNAL HDD;<br>SOURCE CODE AREA;<br>CHARACTER DATA AREA ETC.,<br>BASICALLY ALL CAN BE ACCESSED | EXTERNAL HDD; INTERNAL HDD;<br>SOURCE CODE AREA;<br>CHARACTER DATA AREA;<br>SCHEDULE AREA ETC., BASICALLY ALL CAN BE WRITTEN | NOT FUNCTIONAL |
| FOR IN-COMPANY OFFICE WORK | OFFICE WORK PROGRAMS;<br>SCHEDULE MANAGEMENT APPLICATIONS;<br>EMAIL;<br>DOCUMENT CREATION APPLICATIONS | INTERNAL HDD;<br>CHARACTER DATA AREA;<br>SCHEDULE AREA;<br>NETWORK | INTERNAL HDD;<br>CHARACTER DATA AREA;<br>SCHEDULE AREA | NOT FUNCTIONAL |
| FOR REMOTE WORK AT HOME | DOCUMENT CREATION APPLICATIONS;<br>EMAIL | INTERNAL HDD;<br>CHARACTER DATA AREA;<br>VPN TO COMPANY NETWORK | COMPANY STORAGE;<br>CHARACTER DATA | VALID |
| FOR BUSINESS TRIP WORK | BROWSER ONLY;<br>EMAIL | ONLY DOCUMENTS INPUTTED INTO USB | WRITE NOT ALLOWED | VALID |
| FOR UNREGISTERED LOCATIONS | NOT USABLE | NOT USABLE | WRITE NOT ALLOWED | ACCESS NOT ALLOWED |
| PREDETERMINED SEPARATION POLICY | OFFICE WORK PROGRAMS;<br>EMAIL DOCUMENT CREATION APPLICATIONS | INTERNAL HDD;<br>CHARACTER DATA AREA;<br>NETWORK | INTERNAL HDD CHARACTER DATA | VALID |

FIG. 6A

FIG. 6B

| SEPARATION POLICY | APPLICATION TARGET | | | | PROCESSING TO CLEAR |
|---|---|---|---|---|---|
| | TERMINAL INFORMATION | USER INFORMATION | POSITION INFORMATION | TIME INFORMATION | |
| FOR CONFIDENTIAL IN-COMPANY WORK | RESTRICT TO CERTAIN REGISTERED TERMINALS | PEOPLE REGISTERED FOR EACH POLICY | CERTAIN AREAS IN COMPANY | BASICALLY ALLOWED AT ANY TIME WORK HOURS AND NON-WORK HOURS | LEAVE UNCHANGED |
| FOR IN-COMPANY OFFICE WORK | REGISTERED TERMINALS | PEOPLE REGISTERED FOR EACH POLICY | REGISTERED AREAS IN COMPANY | WORK HOURS | CLEAR CLIPBOARD |
| FOR REMOTE WORK AT HOME | REGISTERED MOBILE TERMINALS | PEOPLE REGISTERED FOR EACH POLICY | HOME OF REGISTERED EMPLOYEE | BASICALLY ALLOWED AT ANY TIME | CLEAR CLIPBOARD; CLEAR TEMPORARY ACCESS |
| FOR BUSINESS TRIP WORK | REGISTERED MOBILE TERMINALS | PEOPLE REGISTERED FOR EACH POLICY | REGISTERED TRIP DESTINATION | TIME AT REGISTERED BUSINESS TRIP DESTINATION | CLEAR CLIPBOARD |
| FOR UNREGISTERED LOCATIONS | REGISTERED MOBILE TERMINALS | NONE | NONE | NONE | NONE |
| PREDETERMINED SEPARATION POLICY | REGISTERED TERMINALS | PEOPLE REGISTERED FOR EACH POLICY | WITHIN COMPANY | WORK HOURS | CLEAR CLIPBOARD |

INFORMATION PROCESSING METHOD AND STORAGE MEDIUM

CROSS-REFERENCE TO RELATED APPLICATION(S)

This application is a continuation of International Patent Application No. PCT/JP2021/027650 filed on Jul. 27, 2021, the entire disclosures of which are incorporated herein by reference.

BACKGROUND OF THE INVENTION

Technical Field

The present invention relates to an information processing method for controlling access to a computer resource managed by an operating system on a computer, and a storage medium.

Background Art

For work in a company or the like, it is typical for each person to be provided with a personal computer (hereinafter, referred to as a PC). However, in more recent times, from the perspective of security, when one person has a plurality of tasks, it is common for a plurality of PCs to be selectively used according to the work content.

For example, when the same PC is used for a task involving important in-company information, a task using the Internet, or tasks performed when teleworking, there are concerns such as the risk of in-company information being leaked outside the company and the risk of being the target of a cyber attack. Thus, it has become desirable to prepare separate operation environments, such as storage areas and networks accessible or usable based on the work content, and carry out tasks on different PCs. In practice, operation environments separated per task are implemented using methods such as physically using a plurality of PCs and using VDI (virtual desktop infrastructure) or virtual PCs on one PC.

However, preparing physical or virtual PCs separated per work content has become problematic due to the resources (PCs and the OS (operating system) and other software) that need to be managed, the complexity involved in using a plurality of PCs, and increasing costs and the like.

One known solution to these problems is a technique for restricting the accessible areas in the same PC using personal authentication of users. For example, in a case where a user accesses resources such as files and storage apparatuses for a computer such as a PC via an application program, to prevent a user without access privileges from intercepting or altering information, there are known methods including a method of providing an access privilege checking function in the operating system (OS) and a method of adding a dedicated access management tool for performing access privilege checks.

For example, many general-purpose OSs have a function for not allowing a user without access privilege to read, write, or execute files. There are also general-purpose OSs such as Windows (registered trademark of the Microsoft Corporation) with settable privileges for deleting files, changing access privileges, and changing ownership privileges.

Also, as disclosed in Patent Document 1 for example, as an access management tool, a technique is known that registers whether or not copying is allowed together with file referencing and, based on this, restricts referencing and copying. Specifically, in the known technique, a reading restriction attribute is added to a display region to prevent capture of a display screen.

Using such techniques, computer resources can be controlled to a certain extent by users switching depending on the operation content even on the same PC.

CITATION LIST

Patent Literature

PTL 1: Japanese Patent Laid-Open No. 7-84852

SUMMARY OF INVENTION

With the known techniques, resource control can be achieved by users switching according to the task of the worker. However, there are cases in which the resource control needed in the known techniques cannot be selected by the worker as they wish. One significant example is how the same selection as when at the company is not allowed when teleworking.

Also, with the known techniques described above, preparing separated environments is often performed for the purpose of having even stronger restrictions, such as "instead of denying as a result of access, not even allowing access in the first place" and "instead of not allowing passage through the network system or the like after communication, not even allowing communication in the first place". In this regard, there is a problem in that it cannot be implemented with the known techniques described above.

An object of the present invention is to provide an information processing method that can control operations by a user without access privilege by, without changing the OS or process (program running on the OS such as application, daemon, or the like), extending the prohibition or restriction item in an existing environment and defining an access privilege extended based on the user use situation for a computer resource needing physical separation such as a file, device, or network usable by a worker.

Solution to Problem

An information processing method of the present invention so as to achieve the above object comprises the following configuration. That is an information processing method for controlling access to a computer resource managed by an operating system on a computer, comprising: capturing an operation request for the computer resource from a process or the operating system before a computer resource is accessed; selecting a policy suitable for a state of a computer from a plurality of policies with access privilege allowed for each one of a plurality of types of work defined as a policy for each work; determining whether or not there is access privilege for a computer resource specified by the operation request captured in the capturing on a basis of the policy selected in the selecting; executing processing to send the operation request as is to the operating system if a result of the determining is that there is an access privilege and send the result back to a request source process; and denying access to the computer resource specified by the operation request if a result of the determining is that there is no access privilege.

In addition, in the denying, if a result of the determining is that there is no access privilege, access to the computer resource specified by the operation request is switched to another computer resource.

In addition, the plurality of policies are stored in a storage included in the computer.

In addition, the plurality of policies are stored in a server that can communicate with the computer and are provided to the computer from the server.

In addition, the state of the computer includes applicable terminal information, user information, terminal location information, and time information.

In addition, the applicable terminal information includes any one of a machine name, an IP address, and a MAC address.

In addition, the user information includes any one of a user name and a group name.

In addition, the terminal location information includes any one of location information obtained from the operating system, a connection AP, and a connection domain name.

In addition, the plurality of policies includes a preset order of priority.

In addition, the selecting includes selecting a policy with a highest order of priority from among policies that match the state of the computer.

In addition, the selecting includes, in a case where, from among policies that match the state of the computer, a plurality of policies have a highest order of priority, further selecting a policy with a highest order of priority from the plurality of policies.

In addition, the selecting includes, in a case where, from among policies that match the state of the computer, a plurality of policies have a highest order of priority, selecting a policy from the plurality of policies via user selection.

In addition, the policy includes, as information for whether or not to allow access, type of executable or non-executable program, reading allowed or not region, writing allowed or not region, and temporary access allowed region.

In addition, the type of executable or non-executable program is registered as any one of a program name, a program path, and a program file hash.

In addition, the reading allowed or not region is registered as any one of a file path, a URL, an IP address, a host name, a USB device ID, an email address, and a wireless LAN AP.

In addition, the writing allowed or not region is registered as any one of a file path, a URL, a USB device ID, and an email address (SMTP).

In addition, the temporary access allowed region is deleted of content at a specified timing from among timing of changing an applied policy, logoff, and program end.

In addition, the capturing further includes capturing an operation request for the computer resource from the process or the operating system before the computer resource is accessed.

In addition, the information processing method further comprises deploying the policy into an access privilege management table including resource specifying information for specifying a specific computer resource, information of a condition for validating an access privilege, and access privilege information for specifying an extended access privilege not defined by an existing environment.

In addition, a program of the present invention causes a computer to execute the information processing method.

In addition, a computer-readable storage medium of the present invention stores a program for causing a computer to execute the information processing method.

Advantageous Effects of Invention

According to the present invention, basically, an operation request from a process or an OS for a computer resource managed by the OS, such as a file, network, storage apparatus, display screen, external apparatus, and the like, is captured before the computer resource is accessed. Next, it is determined whether or not there is an access privilege for the computer resource specified by the captured operation request. If the result of the determination is that there is an access privilege, the operation request is sent as is to the OS and this result is send back to the request source process. If there is no access privilege, access to the computer resource specified in the operation request is denied. Alternatively, after denial, another resource with access privilege is switched. Thus, a user operation for a computer resource needing physical separation, such as a file, device, network, or the like, can be controlled without changing the OS or process (program running on the OS, application, daemon, or the like).

Also, by installing a resource management program in an existing environment, various types of unauthorized access such as those described above can be restricted, and the range of the existing access privileges can be extended.

Also, by installing a resource management program in an existing environment, various types of unauthorized access can be restricted, and the range of known access privileges can be extended.

Also, the complexity involved with using a plurality of PCs and the costs involved with OSs and software can be reduced.

Furthermore, an effect of it being compatible with applications without a function for responding to illegal access can be obtained.

By applying a resource restriction system according to the present invention to telework, which is rapidly becoming more common, effects such as security risks at home being avoided and work similar to that performed at the company being able to be performed can be obtained.

By introducing the present system, company documents, data, and information can be used safely at home without fear of leaking, and the results of telework can be safely or forcibly sent to a specific website or the company.

BRIEF DESCRIPTION OF DRAWINGS

FIG. 3 is a diagram illustrating a data configuration example of an access privilege management table according to an embodiment of the present invention.

FIG. 6A is a diagram illustrating an example of a separation policy according to an embodiment of the present invention.

FIG. 6B is a diagram illustrating an example of a separation policy according to an embodiment of the present invention.

DESCRIPTION OF EMBODIMENTS

First Embodiment

Some embodiments of the present invention will be described in detail below using the drawings. Specifically, a method for allowing and a method for prohibiting an access request for a resource by a resource management program will be described.

Figure 1A:
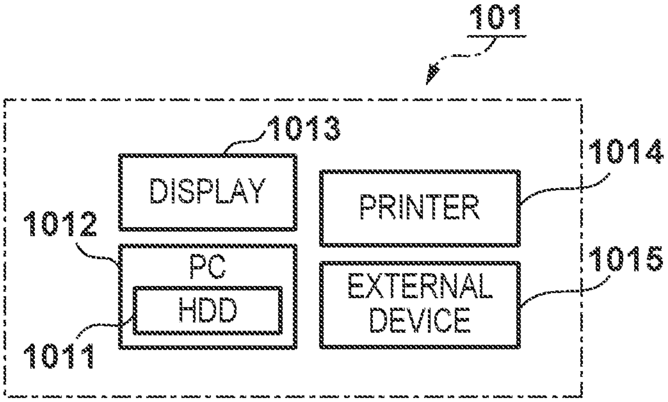
FIG. 1A is a hardware configuration diagram illustrating an embodiment of an environment for implementing the present invention.
Figure 1B:
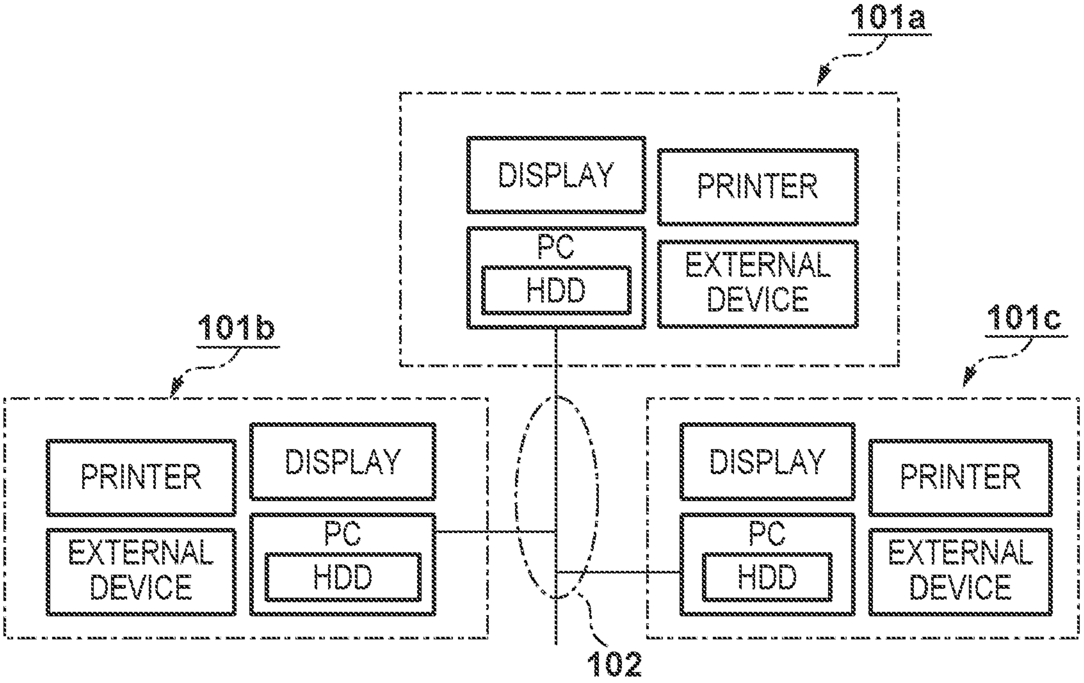
FIG. 1B is a hardware configuration diagram illustrating an embodiment of an environment for implementing the present invention.

FIGS. 1A and 1B are hardware configuration diagrams illustrating one embodiment of an environment for implementing an information processing method according to the present invention.

The configuration in FIG. 1A is a hardware configuration of a computer 101 in a standalone configuration. The computer 101 includes a personal computer (PC) 1012 provided with a hard disk drive (HDD) 1011, a display 1013, a printer 1014, and an external apparatus 1015 that can output resource data to the outside.

A general-purpose OS and application are installed in the personal computer 1012, and the resource management program according to the present invention is also installed. The personal computer 1012 includes a CPU for executing programs such as the OS and the applications.

FIG. 1B is a diagram illustrating the configuration when a network 102 is used. Computers 101*a* to 101*c* with a configuration similar to that illustrated in FIG. 1A are connected to one another via the network 102. The network may be a wireless network. Also, the connection may be via the Internet.

In such a configuration, typically, for an application to access the resources managed by the OS, the API (application program interface) provided by the OS is used. The method for using the API is set by the OS, and an executable code portion that uses the API can be determined. In the present invention, a monitoring routine for monitoring all APIs required to access the resource is provided, and, before an application uses the API, the executable code portion is changed or the entrance of API processing is substituted with the monitoring routine such that the monitoring routine is used when the API is used. The monitoring routine processes the API required by the application, or returns a result to the application as an illegal command without executing the API processing. The access privilege extended by the resource management program of the present invention is managed by this program independently of management of the OS, and a monitoring routine is provided for each type of access privilege. With this method, access from an application that illicitly uses resources is restricted from that application.

Specifically, the resource management program interposed between the application and the operating system, before accessing a computer resource of an operation request from an application specified for accessing the computer resource, monitors and captures the operation request for a specified computer resource from among operation requests issued by the application. Also, whether or not to allow access to the computer resource specified by the captured operation request is determined on the basis of a separation policy, which is a collection of the computer access privileges described below, to control access.

Figure 2:
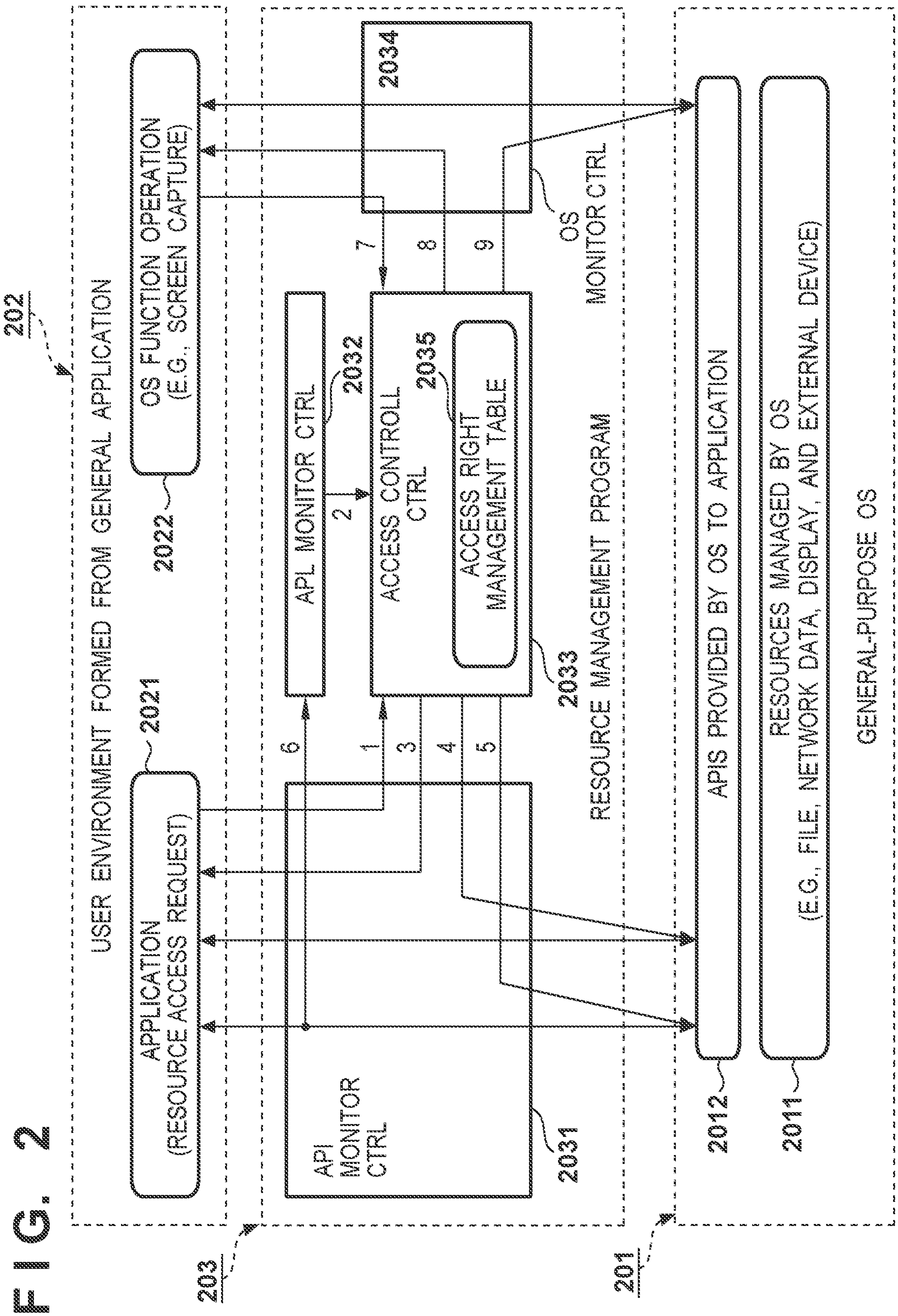
FIG. 2 is a diagram illustrating the functional configuration of a resource management program according to an embodiment of the present invention and the relationship between an OS and an application.

FIG. 2 is a diagram schematically illustrating API monitoring/controlling and the configuration of a resource management program 203 according to the present invention. The resource management program 203 includes an API monitoring controller (API monitoring CTRL) 2031, an APL (application) monitoring controller (APL monitoring CTRL) 2032, an access control controller (access control CTRL) 2033, and an OS monitoring controller (OS monitoring CTRL) 2034.

The resource management program 203 is located between a user environment 202 constituted by a typical application which includes an application 2021 for sending a resource access request and an OS function operation 2022 such as a screen capture and a general-purpose OS 201. The resource management program 203 is configured to monitor requests for resources provided by the general-purpose OS 201 and the user environment 202.

Note that the general-purpose OS 201 includes a resource 2011 managed by the OS and an API group 2012 provided by the OS to the application 2021.

The API monitoring CTRL 2031 in the resource management program 203 according to the present invention is a module for monitoring all APIs required for performing access control. Also, the APL monitoring CTRL 2032 is a module for storing resources held by the application 2021. The access control CTRL 2033 is a module for determining whether or not to allow access to the resource 2011 and includes an access privilege management table 2035. Also, the OS monitoring CTRL 2034 is a module for monitoring the operations to access the resource via the function of the general-purpose OS 201.

As illustrated in FIG. 3, the access privilege management table 2035 is configured to be able to register resource specifying information 20351, a condition 20352, and n pieces of access privilege information 20353 to 2035*n* for each resource.

The resource specifying information 20351 is information for specifying a specific resource 2011 from among the resources 2011 managed by the general-purpose OS 201. In the case of a file, information such as a file name or a file ID is registered. In the case of an application, a program name is registered, for example. In the case of communication data, a host name, a port number, an IP address, or a Bluetooth identifier or Wi-Fi AP (access point) address is registered. In the case of memory, an object name indicating the object, an address, or the like is registered. Also, in the case of an external apparatus, a device name indicating the device driver or a unique identifier called device ID is registered, for example.

The condition 20352 indicates a condition for validating access privilege or a combination thereof. For example, a user name/ID, a group name/ID, time, or the like is registered.

The access privilege information 20353 to 2035*n* indicates, from among access privileges extended but not defined in an existing environment, a privilege added to the specified resource. For example, a privilege to move to another medium, a privilege to copy to another medium, a print privilege, a privilege to load to a shared memory (clipboard or the like in the case of Windows), screen capture privilege, usable application restrictions (prohibited to use outside of specified application, prohibited to attach to email), or the like are registered. Also, for resources involving reading and writing, each of these privileges can be registered. For example, writing to a specific USB memory may be not allowed but read may be allowed. In a case where writing is also allowed, writing using encryption can be specified, and the encryption key at this time is defined by the separation policy (separation policy will be described below in detail). Only a separation policy with the same encryption key can read the information. Thus, the information that can be essentially referenced can be separated on a separation policy basis. Such specifications can be made for resources having writing privilege such as files. USB devices, clipboard, and the like. Communicate resources have reading (receiving) and writing (transmitting) information as well as connecting and accepting information.

Note that typically, access to a resource may be performed via a plurality of APIs. The resource specifying information in this case is converted to an ID (handle or the like) managed by the OS. In this case, inside the resource management program 203, the resource specifying information and the ID are equated with one another.

The processing of the resource management program 203 according to such a configuration will now be described following the information transfer process indicated by (1) to (9) (corresponding to the numbers 1 to 9 in the diagram) in FIG. 2.

(1) If there is an access request to a resource via an API issued by the application 2021, the API monitoring CTRL 2031 captures the request and transfers it to the access control CTRL 2033.

(2) The access control CTRL 2033 obtains, from the APL monitoring CTRL 2032, the information of the resource held by the application 2021 as necessary when an access privilege check is performed.

(3) There are two conditions for being denied access. With a first condition A (access denial A), in response to the access request of (1), the access privilege management table 2035 is referenced and an access privilege check for the resource is performed. In a case where the check result shows no privilege, an illegal access error is returned as the result without executing the API processing of the API issued by the application 2021 being performed.

(4) With a second condition B (access denial B), in response to the access request of (1), the access privilege management table 2035 is referenced and an access privilege check for the resource is performed. In a case where the check result shows no privilege and an error cannot be sent back as a result of the API processing issued by the application 2021, the access request is replaced with an access request for a dummy resource prepared in advance by the resource management program 203, and the API processing is executed without executing the processing for the resource requested by the application 2021.

As a result, the application 2021 runs as if the request succeeded, but actually, the requested resource cannot be accessed.

(5) In a case where the result of the access privilege check for the access request (1) shows a privilege, the API monitoring CTRL 2031 captures the access request, sends the API processing issued by the application 2021 as is to the general-purpose OS 201, and sends the result back to the application 2021.

(6) In a case where, via the processing of (5), API is successful and the application 2021 holds the resource via the API, it is sent to the APL monitoring CTRL 2032. The APL monitoring CTRL 2032 registers the association between the application 2021 and the held resource.

In a case where the application 2021 issues a resource release request API and the API is successful, this is sent to the APL monitoring CTRL 2032. The APL monitoring CTRL 2032 deletes the association between the application 2021 and the previously held resource.

(7) If there is an access request for a resource via the operation of the OS standard function, the OS monitoring CTRL 2034 captures the access request and sends it to the access control CTRL 2033.

(8) For the access request (7), the access privilege management table 2035 is referenced and an access privilege check for the resource is performed. In a case where the check result shows no privilege, the operation of (7) is ignored.

(9) For the access request (7), the access privilege management table 2035 is referenced and an access privilege check for the resource is performed. In a case where the check result shows a privilege, the operation of (7) is sent to the general-purpose OS 201.

Figure 4:
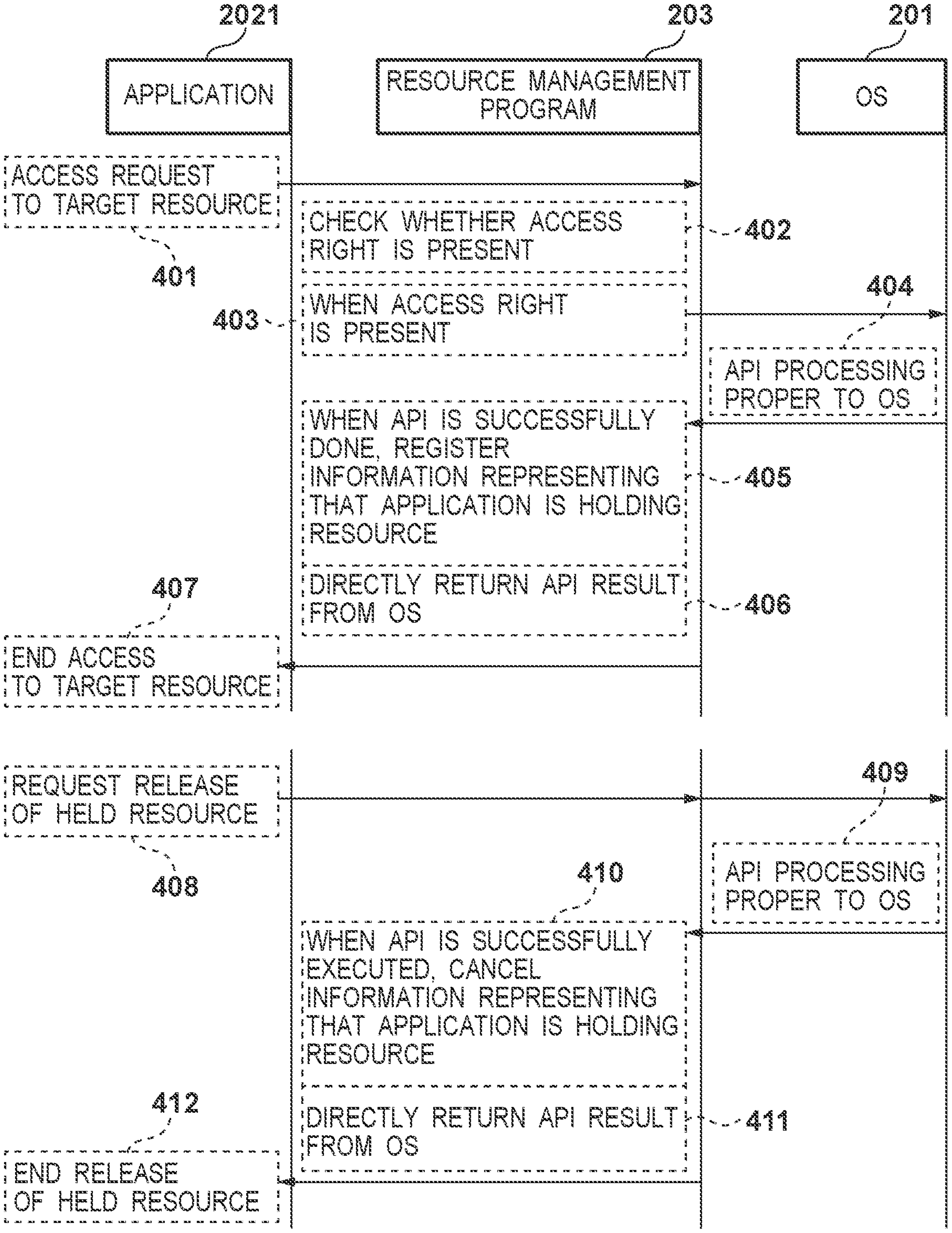
FIG. 4 is a sequence diagram illustrating a first basic mode for API monitoring/controlling according to an embodiment of the present invention.

FIG. 4 is a sequence diagram of a first basic mode (1) for API monitoring and controlling which shows the exchanges between the application 2021, the resource management program 203, and the general-purpose OS 201 until the resource is released in a case where access privilege to the target resource exists.

In the first basic mode (1), in a case where an access request for a target resource exists via an API issued by the application 2021 (step 401), the resource management program 203 checks whether the application 2021 has the access privilege for the resource (step 402). In a case where the check result shows there is access privilege (step 403), the API issued by the application 2021 is sent as is to the general-purpose OS 201. The general-purpose OS 201 executes API processing belonging to the OS (step 404).

In a case where the API processing is successful, the resource management program 203 registers information indicating that the application 2021 is holding the resource (step 405). Then, the API result from the general-purpose OS 201 is sent back as is to the application 2021 (step 406). In this manner, access to the resource is completed (step 407).

Thereafter, in a case where a release request for a held resource is issued from the application 2021 (step 408), the resource management program 203 sends the release request to the general-purpose OS 201. The general-purpose OS 201 executes API processing belonging to the OS (step 409). In a case where the API processing is successful, the resource management program 203 removes information indicating that the application 2021 is holding the resource (step 410). Then, the API result from the general-purpose OS 201 is sent back as is to the application 2021 (step 411). In this manner, release of a held resource is complete (step 412).

Figure 5:
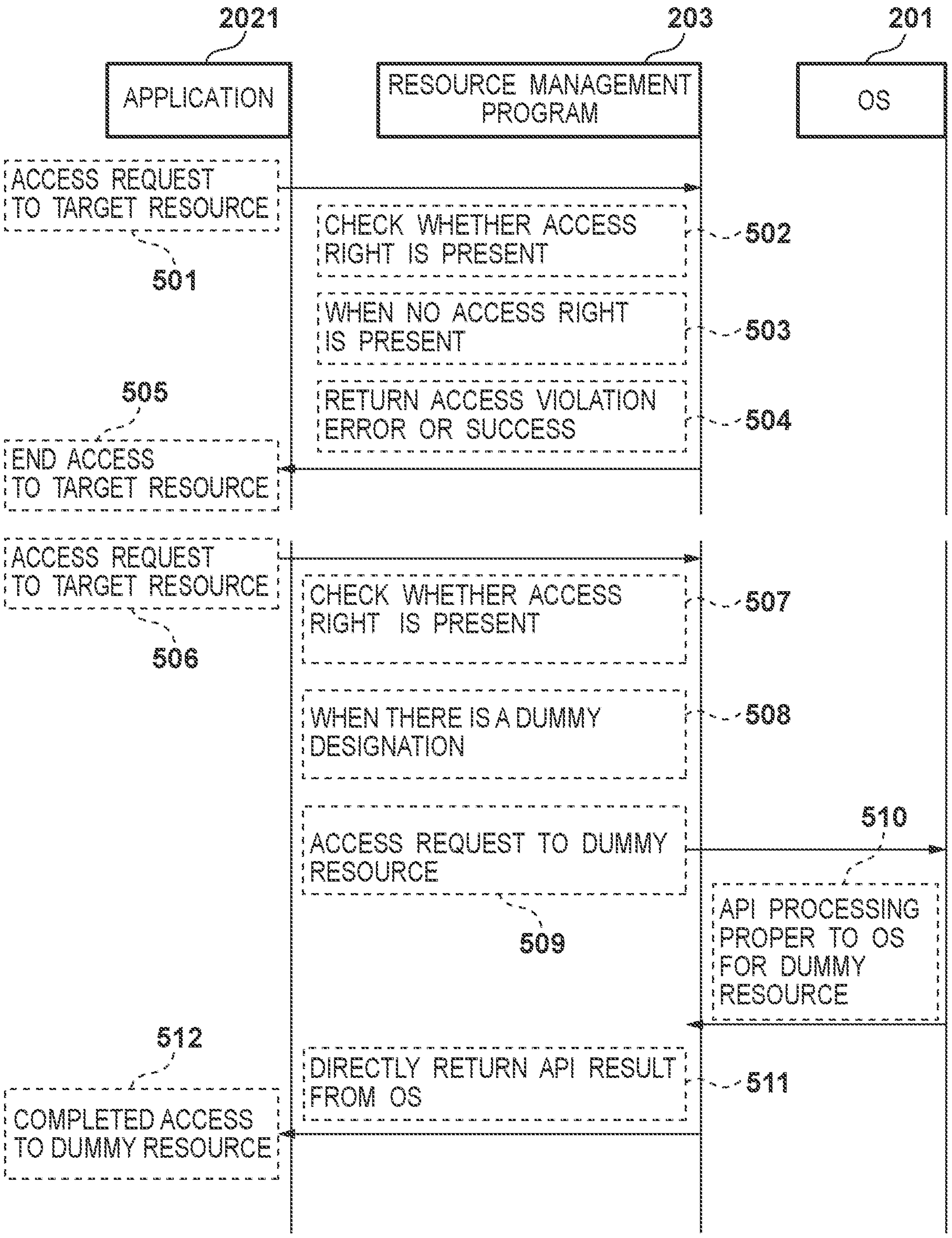
FIG. 5 is a sequence diagram illustrating a second basic mode for API monitoring/controlling according to an embodiment of the present invention.

FIG. 5 is a sequence diagram of a second basic mode (2) for API monitoring and controlling which shows the exchanges between the application 2021, the resource management program 203, and the general-purpose OS 201 until access is denied in a case where access privilege to the target resource does not exist.

In the second basic mode (2), in a case where an access request for a target resource exists via an API issued by the application 2021 (step 501), the resource management program 203 checks whether the application 2021 has the access privilege for the resource (step 502). In a case where the check result shows no access privilege (step 503), an illegal access error is sent back to the application 2021 (step 504). In this manner, processing for access to a resource ends (step 505).

In a case where an access request for a target resource exists via an API issued by the application 2021 not responding to an illegal access error (step 506), the resource management program 203 checks whether the application 2021 has the access privilege for the resource (step 507). In a case where the check result shows no access privilege and the application 2021 is not responding to the illegal access error (step 508), the access request is replaced with an access request for a dummy resource prepared in advance by the resource management program 203, and this is sent to the general-purpose OS 201 (step 509).

The general-purpose OS 201 executes API processing belonging to the OS (step 510). The resource management program 203 sends the API processing result from the general-purpose OS 201 as is back to the application 2021 (step 511). As a result, processing for access to a target resource ends, but due to dummy resource, essentially nothing happens (step 512).

Note that a case where an illegal access error is sent back to the application 2021 and where the access request is replaced with an access request for a dummy resource prepared in advance, in a case where there is no access privilege, has been described above. However, the access request may be replaced so that another resource allowed to be accessed is accessed. Whether the replacement is with a dummy or another resource is specified in the access privilege management table 2035.

Next, a further characteristic configuration according to the present embodiment will be described. A method for allowing and a method for prohibiting an access request for a resource by the resource management program 203 has been described above. Described below is a method for managing access requests for a resource by the resource management program 203 on the basis of a separation policy, where, for a plurality of types of tasks, policies (hereinafter, referred to as separation policies) are collectively defined for each task for access privileges required for each task.

A separation policy includes an application executable or not executable for the corresponding task, areas (such as a specific local disk or network disk) which are readable and writable or not readable and writable, allowed communication destinations (such as email or the Internet), target user, PC, time period, use location, and similar information.

The plurality of defined separation policies are manually switched by the user or automatically switched when a PC is used, and, when the PC is running, one of these separation policies is always applied to the resource management program 203.

For the OS or software running on a PC, the resource management program 203 performs control to allow an access request for a resource only in the range defined by the applied separation policy. In other words, control is performed to satisfy the separation policy by the resource management program 203 capturing the processing executed by the OS or software at the API level, processing violating the separation policy being prohibited, and only allowing processing that satisfies the separation policy to be executed. Alternatively, processing that violates the separation policy may be prohibited as well as being switched to a different processing that does satisfy the separation policy.

In "API capture" by the resource management program 203, the required capture is performed not only at the application level but also at a system level called the driver and service to implement separation equivalent to that of PCs being physically separated.

For example, to not allow access to the Internet, various known techniques such as denying access partway along the communication path can be implemented. However, with a physical separation, the PCs are able to be not even connected to such a network. On the other hand, in the present embodiment, using the resource management program 203, whether to allow access to a communication resource (for example, a network card or the like) for implementing communication with the network is determined at the API level inside the PC, and thus, when the access is denied, communications do not flow through the connected network. This is as effective as physical separation in relation to recent concerns such as the communication device itself being targeted with a cyber attack and the like.

Next, examples of items for setting allow or prohibit using a separation policy according to the present embodiment will be described.

First, the following are examples of separation policy control information. These may correspond to the resource specifying information in FIG. 3, for example.

(1) Execute or Not Program

The specification of whether each program is allowed to be executed or is prohibited is registered as a program name, a program path, or a program file hash.

(2) Reading Access (Connection) or Not Region

The region for specifying whether the reading of each type of information is allowed or prohibited is registered as a file path, URL, IP address, host name, USB device ID, email address, or wireless LAN AP.

(3) Writing Allowed or Not Region

The region for specifying whether writing is allowed or prohibited is registered as a file path, URL (POST/PUT command), USB device ID, email address (SMTP), or a data type such as clipboard. Allowing writing can be set to specify encrypted writing. The encryption key in this case is defined by the separation policy. As described above, by defining the encryption key for encrypted writing for each separation policy, only a separation policy with the same encryption key can read the information. Thus, the information that can be essentially referenced can be separated on a separation policy basis.

(4) Temporary Access Allowed Region

By specifying the timing of changing the applied separation policy, logoff, and program end, a region (path specification) where the content is deleted at the specified timing is specified.

The following are examples of separation policy application target information. These may correspond to the controllable conditions or the access privileges in FIG. 3.

(1) Applied Terminal (PC) Information

A machine name, IP address, and/or MAC address are registered.

(2) Applied User Information

A user name and/or group name are registered.

(3) Applied Location Information

Location information, connection AP, connection domain name, and/or a specific in-company PC obtained from the OS are registered.

(4) Applied Time Information (Time Information)

The time, time period, and/or day of application are registered.

Also, clear processing of the information of when switching to another separation policy is executed as follows.

(1) For the clipboard, "clear/restrict specific type/leave unchanged" is specified.

(2) For the temporary access allowed region, "clear/deny access until same policy is applied/leave unchanged" is specified.

The control information, application target information, and clear information described above are made a set to define one separation policy. Note that a plurality of separation policies can be defined by defining each name, and the plurality of separation policies are switched between via the separation policy switching mechanism and applied to the resource management program 203.

For a separation policy to be applied to the resource management program 203, the separation policy provided to the resource management program 203 is analyzed by the access control CTRL 2033 illustrated in FIG. 2 and applied to the access privilege management table 2035 by deploying the resource specifying information, access privilege information, and the like as illustrated in FIG. 3. Note that the separation policy switching mechanism may be configured to switch via a user selection or may be configured to automatically switch on the basis of location information (for example, at a company or at home) of where the PC is used.

FIGS. 6A and 6B are diagrams illustrating detailed examples of separation policies.

Examples of separation policies to be used at a company or the like include a confidential work separation policy, an in-company office work separation policy, a remote work at home separation policy, a business trip work separation policy, an unregistered location separation policy, a predetermined separation policy, and the like.

Specifically, with the confidential work separation policy, the terminals (PCs) to which the separation policy is applied are restricted, the people who use them are restricted to certain management or development personnel, and the usable location and the like is also strictly restricted. Also, the resource management program 203 to which the confidential work separation policy is applied allows access to substantially all of the resources for access requests from the application 2021. For example, regarding usable programs, access is allowed to basically all of the programs, such as a schedule management application, a development application, a document creation application, and the like. Also, regarding the readable area, the writable area, and the like, an external HDD, the internal HDD, and other storage areas are basically all allowed to be used. Accordingly, the company's confidential information and the like can be accessed by only certain people, and the various types of tasks using the information can be freely performed. However, access to networks such as an intracompany network and the Internet is not allowed due to the nature of possibly dealing with confidential information.

With the in-company office work separation policy, compared to the confidential work separation policy, the range of people registered for office work at the company that can use a terminal is expanded, and the location information which allows the use of the terminal is expanded. In this manner, by increasing the number of people or locations allowed for use, the security level is reduced. Thus, the resource management program 203 reduces the number of resources that can be accessed in the case of this separation policy being applied compared to the confidential work separation policy. For example, regarding usable programs, development applications are made not usable, and basically, access is allowed only to programs required for office work, such as schedule management applications, document creation applications, and the like. Also, regarding the readable area, the writable area, and the like, access to an external HDD is not allowed, and only access to the internal HDD is allowed. Also, access to networks such as an intracompany network and the Internet is allowed to allow for searching using the Internet. Alternatively, depending on the work, access may be allowed to the intracompany network, but communication via the Internet may be not allowed.

Also, with the remote work at home separation policy, the terminal to which the separation policy is applied is a mobile PC registered with the company, and the usable location is the home of a company employee registered with the company. In a case where the remote work separation policy is applied, the terminal references its GPS information and the registered address of the home of the employee and applies the separation policy to the resource management program 203. When remote working from home, because the security level is lower than the security at the company, the usable programs are further restricted. For example, development applications, office work applications, and the like are unable to be used, and basically only programs required for working at home such as document creation applications are allowed to be accessed. Also, regarding the readable area, the writable area, and the like, access to an external HDD is not allowed, only reading from the internal HDD is allowed, and only storage prepared in the company are readable and writable. Also, for the Internet and intracompany storage to be used via an intracompany network, the network allows access only for a VPN (virtual private network) to connect to the intracompany network.

Also, with the business trip work separation policy, the terminal to which the separation policy is applied is a mobile PC registered with the company, and the usable location is the trip destination registered with the company. In a case where the business trip work separation policy is applied, the GPS information and the registered address of the trip destination are referenced and applied to the resource management program 203. Also, the usable programs are restricted to a greater extent than with working from home with only browsers and email being made usable. Also, the readable area is restricted to only the content of the carried USB memory, for example. Access to a network is also not allowed.

Also, in a case where a terminal registered with the company is trying to be used by an employee or another person at an unknown location such as an unregistered location, as the security state is unknown, the resource management program 203 prohibits access to all resources.

The predetermined separation policy is a separation policy preset to be used in a case where no applicable policy exists. With the predetermined separation policy, typical office work programs, document creation applications, email, and the like can be used. With the predetermined separation policy, it is assumed that the terminal is used at the company, and the work typically performed at the company is allowed. Also, as with the in-company office work separation policy, access to networks such as an intracompany network and the Internet is allowed to allow for searching using the Internet.

Next, a method for managing separation policies will be described.

(1) When the Separation Policy is Held as a File

Information of a "separation policy example" is stored in a separation policy file in an encrypted state or as is.

The separation policy file may be stored in advance in the terminal PC to be used or stored in a management server with the latest policy being transferred to the terminal PC when a connection with the server is made. In a case where the separation policy file is managed by the management server, irrespective of the applied policy, the management server and the terminal PC are configured to be able to communicate with one another to allow for the separation policy to be received from the management server.

(2) When the Separation Policy is Dynamically Sent from the Management Server

The terminal PC does not hold the actual policy file and stores the separation policy received from the management server in its memory for use. The data (PC name, user name, location) required for policy selection is transmitted to the server periodically or per specific event, and the server provides the terminal PC with the corresponding separation policy. At a timing when no policies exist, for example, after a restart, the "predetermined separation policy" described above is used.

(3) When the Predetermined Separation Policy is Used

The predetermined separation policy is a separation policy preset to be used in a case where no applicable policy exists, as described above. The predetermined separation policy may be stored as a file in a terminal or may be implemented as a specified value in a system. Normally, the predetermined separation policy is defined as restricted conditions such as the management server and the terminal PC being communicatively connected and a local disk being unable to be used.

Next, a method for switching separation policies such as those described above depending on the work will be described.

First, candidates of the separation policies to be applied at the start of the PC are those having application target information which matches with the PC use situation. Also, an order of priority can be defined for the separation policies on the basis of, of the application target information, the application terminal information, application user information, application location information, application time information, and similar types of information, and the applicable separation policy with the highest order of priority is made the candidate.

Take an example where, for the information type order of priority, it is defined that the application terminal information is high in the order and the application user information is low in the order. If a user B uses a terminal A, then out of the separation policy of the terminal A and the separation policy for the user B, the separation policy for the terminal A would be made the candidate.

Also, an application order of priority can be defined for separation policies belonging to the same information type or the same order of priority can be defined. In a case where there are still a plurality of candidates after restriction using the information type order of priority, selection is made according to the priority order of the separation policies.

In a case where the result of restricting the separation policy candidates in this manner produces a plurality of separation policy candidates, the user can select any one from these. If the user does not select one, the first separation policy compatible inside the PC is applied.

Figure 7:
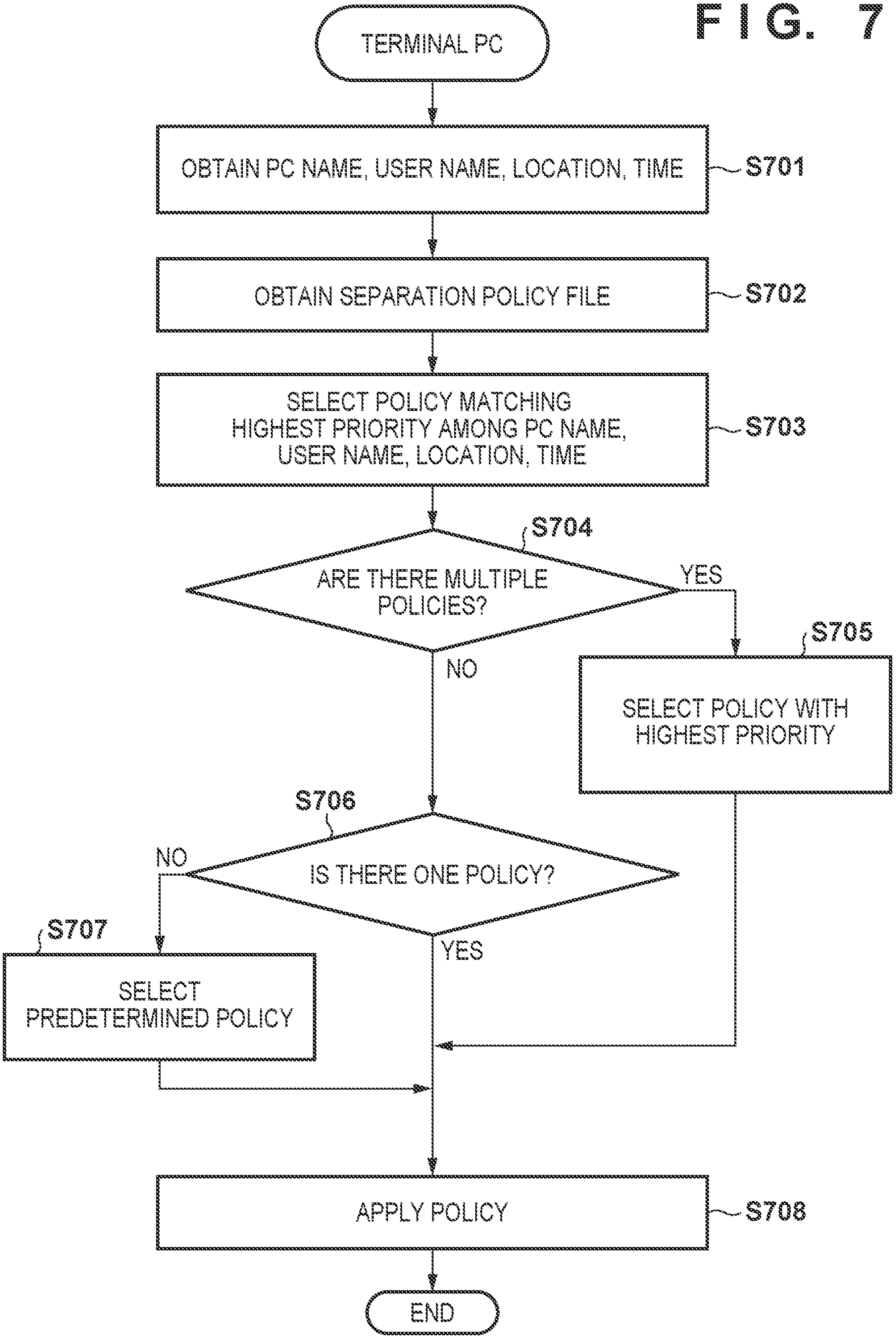
FIG. 7 is a diagram illustrating the operations of a terminal PC for selecting a separation policy according to an embodiment of the present invention.

FIG. 7 is a flowchart illustrating the operations when a terminal PC selects a separation policy. The operations of the flowchart in FIG. 7 are started when the terminal PC is started up. Note that the terminal PC may be the PC illustrated in FIG. 1B.

In step S701, the CPU of the terminal PC obtains the information of its PC name, a user name, a use location, and the time.

In step S702, the CPU of the terminal PC obtains the separation policy file stored in its hard disk or the like.

In step S703, the CPU of the terminal PC selects the separation policy that matches with the application target information with the highest order of priority from among the application target information including PC name, user name, use location, time, and the like.

In step S704, the CPU of the terminal PC determines whether or not there are a plurality of policies corresponding to the application target information with the highest priority selected in step S703. In a case where there is a plurality, the flow proceeds to step S705. Otherwise, the flow proceeds to step S706.

In step S705, the CPU of the terminal PC selects the separation policy with the preset highest order of priority from among the plurality of separation policy candidates.

In step S706, the CPU of the terminal PC determines whether or not there is one separation policy. In a case where there is one separation policy, the flow proceeds to step S708. In a case where there are no separation policies, the flow proceeds to step S707.

In step S707, the CPU of the terminal PC selects the predetermined separation policy.

In step S708, the separation policy selected in one of the steps S705 to S707 is applied to the resource management program 203.

Note that as described above, in step S706, the separation policy with the preset highest order of priority from among the plurality of separation policy candidates is selected. However, the user may perform the selection.

Figure 8:
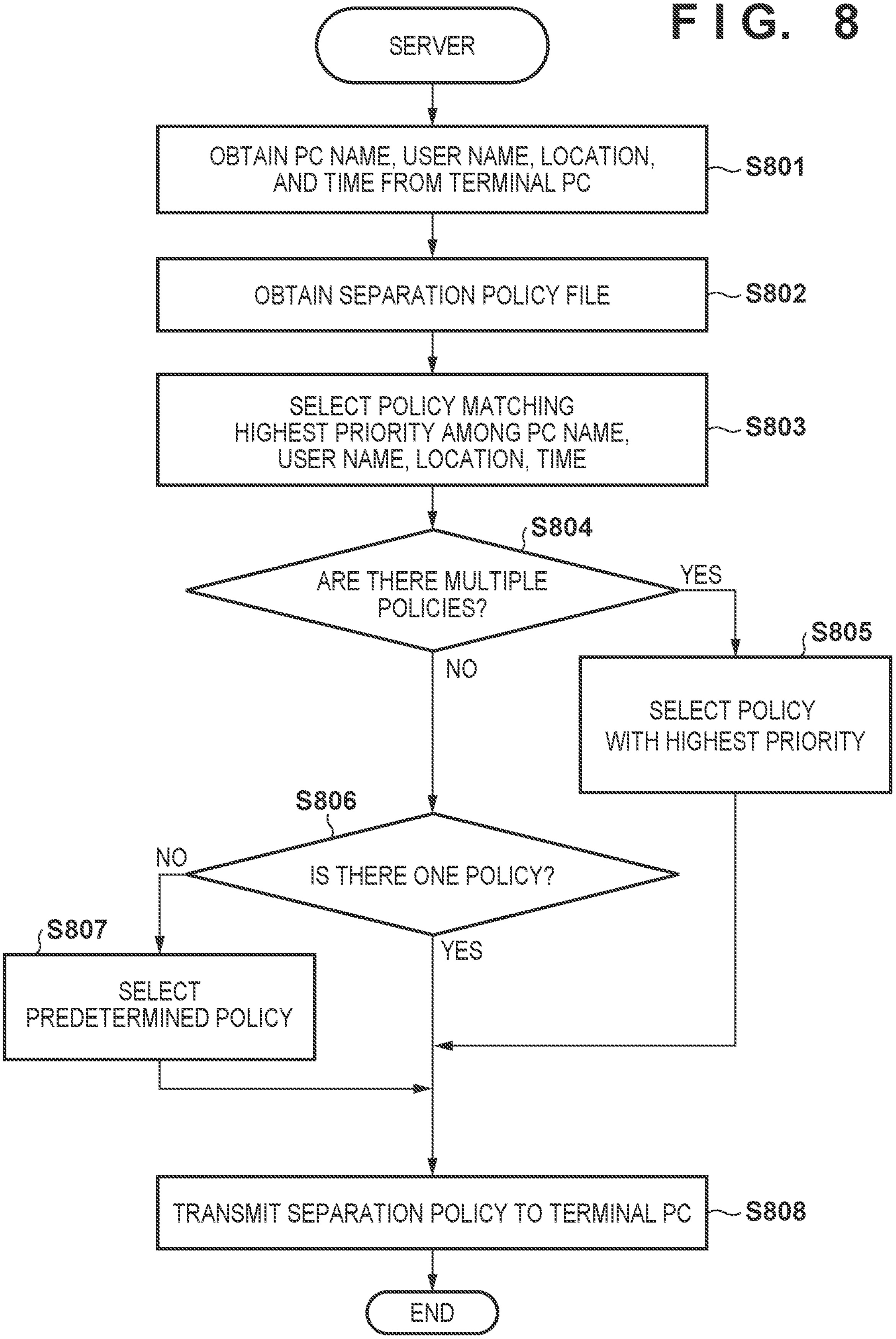
FIG. 8 is a diagram illustrating the operations of a server for selecting a separation policy according to an embodiment of the present invention.

FIG. 8 is a flowchart illustrating the operations for the server to select a separation policy when separation policies are provided to the terminal PC from the server. The operations of the flowchart in FIG. 8 are started when the server receives a transmission request for a separation policy from the terminal PC. Note that the server may be one of the PCs illustrated in FIG. 1B, and the terminal PC may be another PC in FIG. 1B.

In step S801, the CPU of the server obtains the information of a PC name, a user name, a use location, and the time from the terminal PC.

In step S802, the CPU of the server obtains the separation policy file stored in its hard disk or the like.

In step S803, the CPU of the server selects the separation policy that matches with the application target information with the highest order of priority from among the application target information including PC name, user name, use location, time, and the like received from the terminal PC.

In step S804, the CPU of the server determines whether or not there are a plurality of policies corresponding to the application target information with the highest priority selected in step S803. In a case where there is a plurality, the flow proceeds to step S805. Otherwise, the flow proceeds to step S806.

In step S805, the CPU of the server selects the separation policy with the preset highest order of priority from among the plurality of separation policy candidates.

In step S806, the CPU of the server determines whether or not there is one separation policy. In a case where there is one separation policy, the flow proceeds to step S808. In a case where there are no separation policies, the flow proceeds to step S807.

In step S807, the CPU of the server selects the predetermined separation policy.

In step S808, the CPU of the server transmits the separation policy selected in one of the steps S805 to S807 to the terminal PC.

Note that as described above, in step S805, the separation policy with the preset highest order of priority from among the plurality of separation policy candidates is selected. However, the plurality of separation policy candidates may be transmitted to the terminal PC as is, so the user may select the separation policy to be applied on the terminal PC.

In the examples described above, what separation policy is selected is determined when the terminal is started up. However, the processing described above may be executed to change the separation policy as appropriate at timing such as when the user information is changed such as when logging in or when switching users, when the registered location information is confirmed or changed, when the date and time obtained from the OS is changed, and the like. Also, each time, the operations of the OS when using the PC and all of the programs are controlled according to the separation policy selected and applied by the selection method described above.

The present invention is configured to restrict access to resources without access privilege as described above. Now, an example using API in the case of UNIX and Windows, general-purpose OSs, will be described. The example described below is of prohibiting processing to duplicate a file.

Regarding file duplication processing, with known techniques, a readable file can be copied, and as a result, a plurality of duplicates of the original can exist and be transferred to another medium and taken away. In the present invention, by monitoring/controlling the API for implementing file copy, copying of a file without privilege is prohibited. In this case, for Windows, the following examples are APIs to be monitored/controlled. Note that the functions of the APIs described below have been described in various documents and thus will not be described in detail.

(1) File Open/Create API
 CreateFileA
 CreateFileW
 OpenFile
 _lopen
 _lcreat
 GetOpenFileNameA
 GetOpenFileNameW
 GetSaveFileNameA
 GetSaveFileNameW
(2) File Close API
 CloseHandle
 _lclose
(3) File Copy/Move API
 CopyFileA
 CopyFileW
 MoveFileA
 MoveFileW
 MoveFileExA
 MoveFileExW
 DeleteFileA
 DeleteFileW
 DragQueryFileA
 DragQueryFileW The following examples are APIs that are monitored/controlled in the case of UNIX.

(1) File Open/Create API
 open
 creat
(2) File Close API
 close
(3) File Copy/Move API
 rename The following are three detailed methods for when file duplication processing is prohibited by API monitoring in this manner.

Method 1: When Duplication Processing is Found to be Executed while a File is Open The application denies the creation of another file while a file without duplication privilege is opened (time period until the file is closed).

Method 2: When there is a Possibility of Duplication Processing being Performed after a File is Closed but a Plurality of Files is Found to be not being Handled The application denies the creation of another file until the application ends or a file with duplication privilege is opened in a case where a file without duplication privilege has been opened.

Method 3: When there is a Possibility of Duplication Processing being Performed after a File is Closed and a Possibility of a Plurality of Files being Handled The application denies the creation of another file until the application ends in a case where a file without duplication privilege has been opened.

Note that with any one of these methods, when it is found that a duplication is not left by a separately created file (creation of temporary file or the like), it is not denied.

Note that the object of the present invention can naturally also be achieved by a storage medium storing a program code for software to implement the functions of the embodiments described above being provided to a system or apparatus, and a computer (or CPU or MPU) of the system or apparatus reading out and executing the program code stored on the storage medium.

In this case, the program code read out from the storage medium implements the functions of the embodiments described above, and the storage medium storing the program code constitutes the present invention.

Examples of a medium that can be used to provide a program code includes a floppy (registered trademark) disk, a hard disk, an optical disk, a magneto-optical disk, CD-ROM, CD-R/RW, DVD-ROM/RAM, a magnetic tape, a non-volatile memory card, ROM, and the like.

Also, not only can the functions of the embodiments described above be implemented by the computer executing the read program code, but naturally also the functions of the embodiments described above may be implemented by the OS or platform running on a computer executing a part or all of the actual processing on the basis of an instruction in the program code.

Also, naturally, the functions of the embodiments described above may be implemented by the CPU or the like of a function extension board or a function extension unit executing a part or all of the actual processing on the basis of an instruction in the program code after the program code read from the storage medium is written to a memory of the function extension board inserted in a computer or the function extension unit connected to a computer.

In a case where the present invention is applied to the medium described above, this storage medium stores a program code corresponding to the flowchart described above.

What is claimed is:

1. An information processing method for controlling access to a computer resource managed by an operating system on a computer that is used by a user, the method comprising:

in the computer:

capturing an operation request for the computer resource from a process or the operating system before the computer resource is accessed, wherein the computer resource comprises a hardware computer resource including a communication resource that implements communication with a network;

selecting a policy suitable for a state of a computer from a plurality of policies with access privilege allowed for each one of a plurality of types of work defined as a policy for each work;

determining whether or not there is access privilege for the hardware computer resource specified by the operation request captured in the capturing on a basis of the policy selected in the selecting;

executing processing to send the operation request as is to the operating system if a result of the determining is that there is an access privilege and send the result back to a request source process; and denying access to the hardware computer resource specified by the operation request if a result of the determining is that there is no access privilege, wherein the denying access to the communication resource prevents communication from flowing through a connected network via the communication resource, wherein the policy includes, as information for whether or not to allow access, a type of executable or non-executable program, a reading allowed or not region, a writing allowed or not region, and a temporary access allowed region, wherein the content of the temporary access allowed region is deleted at a specified timing selected from the timing of changing an applied policy and logoff.

2. The information processing method according to claim 1, wherein in the denying, if a result of the determining is that there is no access privilege, access to the hardware computer resource specified by the operation request is switched to another hardware computer resource.

3. The information processing method according to claim 1, wherein the plurality of policies are stored in a storage included in the computer.

4. The information processing method according to claim 1, wherein the plurality of policies are stored in a server that can communicate with the computer and are provided to the computer from the server.

5. The information processing method according to claim 1, wherein the state of the computer includes applicable terminal information, user information, terminal location information, and time information.

6. The information processing method according to claim 5, wherein the applicable terminal information includes any one of a machine name, an IP address, and a MAC address.

7. The information processing method according to claim 5, wherein the user information includes any one of a user name and a group name.

8. The information processing method according to claim 5, wherein the terminal location information includes any one of location information obtained from the operating system, a connection AP, and a connection domain name.

9. The information processing method according to claim 1, wherein the plurality of policies includes a preset order of priority.

10. The information processing method according to claim 9, wherein the selecting includes selecting a policy with a highest order of priority from among policies that match the state of the computer.

11. The information processing method according to claim 10, wherein the selecting includes, in a case where, from among policies that match the state of the computer, a plurality of policies have a highest order of priority, further selecting a policy with a highest order of priority from the plurality of policies.

12. The information processing method according to claim 10, wherein the selecting includes, in a case where, from among policies that match the state of the computer, a plurality of policies have a highest order of priority, selecting a policy from the plurality of policies via user selection.

13. The information processing method according to claim 1, wherein the type of executable or non-executable program is registered as any one of a program name, a program path, and a program file hash.

14. The information processing method according to claim 1, wherein the reading allowed or not region is registered as any one of a file path, a URL, an IP address, a host name, a USB device ID, an email address, and a wireless LAN AP.

15. The information processing method according to claim 1, wherein the writing allowed or not region is registered as any one of a file path, a URL, a USB device ID, and an email address (SMTP).

16. The information processing method according to claim 1, wherein the capturing further include capturing an operation request for the hardware computer resource from the process or the operating system before the hardware computer resource is accessed.

17. The information processing method according to claim 1, further comprising:

deploying the policy into an access privilege management table including resource specifying information for specifying a specific hardware computer resource, information of a condition for validating an access privilege, and access privilege information for specifying an extended access privilege not defined by an existing environment.

18. A non-transitory computer-readable storage medium storing a program for causing a computer to execute an information processing method for controlling access to a computer resource managed by an operating system on a computer that is used by a user, the method comprising:

in the computer:

capturing an operation request for the computer resource from a process or the operating system before the computer resource is accessed, wherein the computer resource comprises a hardware computer resource including a communication resource that implements communication with a network;

selecting a policy suitable for a state of a computer from a plurality of policies with access privilege allowed for each one of a plurality of types of work defined as a policy for each work;

determining whether or not there is access privilege for the hardware computer resource specified by the operation request captured in the capturing on a basis of the policy selected in the selecting;

executing processing to send the operation request as is to the operating system if a result of the determining is that there is an access privilege and send the result back to a request source process; and denying access to the hardware computer resource specified by the operation request if a result of the determining is that there is no access privilege, wherein the denying access to the communication resource prevents communication from flowing through a connected network via the communication resource, wherein the policy includes, as information for whether or not to allow access, a type of executable or non-executable program, a reading allowed or not region, a writing allowed or not region, and a temporary access allowed region, wherein the content of the temporary access allowed region is deleted at a specified timing selected from the timing of changing an applied policy and logoff.

* * * * *